July 10, 1923.

T. H. HUNTER ET AL 1,461,527

RUBBER APRON FOR CARDING MACHINES

Filed July 16, 1919

Inventors
Thomas H. Hunter
George W. Hunter
By W. W. Williamson
Atty.

Patented July 10, 1923.

1,461,527

UNITED STATES PATENT OFFICE.

THOMAS H. HUNTER AND GEORGE W. HUNTER, OF PHILADELPHIA, PENNSYLVANIA.

RUBBER APRON FOR CARDING MACHINES.

Application filed July 16, 1919. Serial No. 311,249.

*To all whom it may concern:*

Be it known that we, THOMAS H. HUNTER and GEORGE W. HUNTER, citizens of the United States, residing at Philadelphia, in the county of Philadelphia and State of Pennsylvania, have invented new and useful Improvements in Rubber Aprons for Carding Machines, of which the following is a specification.

Our invention relates to a new and useful improvement in rubber aprons for carding machines, and has for its object to so construct such an apron from rubber that it will have a peculiar action upon the material being carded and overcome the disadvantages which have heretofore been experienced where leather or other material was used in making such aprons.

A further object of our invention is to so construct an apron for the rubbing process that it will travel true upon the rolls and be guided against displacement.

With these ends in view, this invention consists in the details of construction and combination of elements hereinafter set forth and then specifically designated by the claims.

In order that those skilled in the art to which this invention appertains, may understand how to make and use the same, we will describe its construction in detail, referring by numerals to the accompanying drawings forming a part of this application, in which:—

Figure 1:
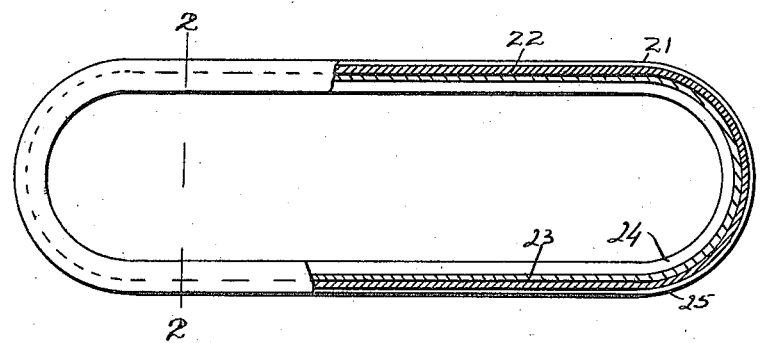
Figure 2:
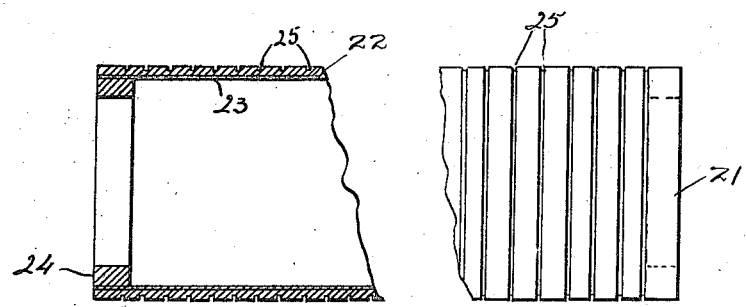

Fig. 1, is a sectional edge view of a rubbing apron embodying our invention. Fig 2, is an end view thereof partly broken away and shown in section upon the line 2—2 of Fig. 1. In carrying out our invention as here embodied, 21 represents a rubbing apron comprising a body 22 which is molded in the form of a belt from soft reclaimed rubber and on the inside or inner face of this body is attached or fixed a canvas backing 23 which will prevent undue stretching of the apron while to the edges of the apron on the inside or inner face of the canvas backing are attached or fixed the inwardly projecting rubber flanges 24. The outside or outer face of the rubber body of the apron is grooved lengthwise as at 25, said grooves serving to take hold upon the material being carded so as to more effectually roll said material. In practice the flanges project over the ends of the rolls of a carding machine, thus causing the apron to travel true upon the rolls and prevent sidewise displacement.

Of course we do not wish to be limited to the exact details of construction as herein shown as these may be varied within the limits of the appended claims without departing from the spirit of our invention.

Having thus fully described our invention, what we claim as new and useful is:—

1. A rubbing apron comprising a rubber body, a canvas backing fixed to the inner face of said body, and rubber flanges located at each edge of the apron and fixed to the inner face of said canvas backing.

2. A rubber apron comprising a rubber body having longitudinal grooves in its outer face, a canvas backing fixed to the inner face of said body to prevent undue stretching of said body and inwardly projecting rubber flanges fixed to the inner face of the canvas backing at the edges of the apron.

In testimony whereof, we have hereunto affixed our signatures.

THOMAS H. HUNTER.
GEORGE W. HUNTER.